March 18, 1941.　　M. I. MATHEWSON ET AL　　2,235,558
GRINDING MACHINE
Original Filed Nov. 14, 1935　　9 Sheets-Sheet 2

March 18, 1941.        M. I. MATHEWSON ET AL        2,235,558
GRINDING MACHINE
Original Filed Nov. 14, 1935        9 Sheets-Sheet 3

Inventors
Maxwell I. Mathewson
August L. Krause
by Fish Hildreth
Cary & Jenney
Attorneys March 18, 1941. M. I. MATHEWSON ET AL 2,235,558
GRINDING MACHINE
Original Filed Nov. 14, 1935 9 Sheets-Sheet 6

Inventors
Maxwell I. Mathewson
August L. Krause
by Fish Hildreth
Cary & Jinney
Attorneys March 18, 1941. M. I. MATHEWSON ET AL 2,235,558

GRINDING MACHINE

Original Filed Nov. 14, 1935    9 Sheets-Sheet 9

Inventors
Maxwell I. Mathewson
August L. Krause
by Fish Hildreth
Cary & Jenney
Attorneys Patented Mar. 18, 1941

2,235,558

UNITED STATES PATENT OFFICE 2,235,558

GRINDING MACHINE

Maxwell I. Mathewson and August L. Krause, Providence, R. I., assignors to Brown and Sharpe Manufacturing Company, a corporation of Rhode Island Original application November 14, 1935, Serial No. 49,772. Divided and this application October 4, 1937, Serial No. 167,190

34 Claims. (Cl. 172—240)

The present invention relates to improvements in grinding machines, and more particularly to operating and control devices for imparting translatory movements to a reciprocable work table of such a machine.

It is a principal object of the invention to provide novel operating and control devices for driving the work table which will be readily adjustable to control the operation of the table for a wide variety of operating conditions which may include both power and manual operation.

It is a further object of the invention to provide a novel slow-down mechanism for the table which is rendered operative under certain operating conditions to insure an accurate and dependable control of table reversal.

It is another object of the invention to provide in a table controlling and driving mechanism of this general description, a novel and improved dwell mechanism which is operative to secure a predetermined amount of dwell at each reversal in the direction of table travel.

It is a further object of the invention to provide electrical operating and controlling devices for the work table which may well form an integral part of an electrical operating system for the machine, and which are well adapted to insure at all times a dependable and accurate operation of the table over a wide range of operating conditions, as hereinafter more particularly set forth.

The invention is herein disclosed in a preferred form in a grinding machine of the general type which comprises a longitudinally movable work table having supported thereon a rotatable work holder in the form of the usual headstock and tailstock, a power driven grinding wheel spindle, and a wheel spindle carriage which is supported on cross ways for movement toward and away from the work. The several cooperating mechanisms of the machine are electrically driven and controlled by means of a number of electric motors, as fully set forth in applicant's copending application Serial No. 49,772, filed November 14, 1935, now Patent No. 2,165,898 of which the present application is a division.

The work table of the present machine is driven by means of a direct current motor which is controlled by a field rheostat to permit a wide latitude in the rate of drive. The table motor is reversible to reverse the direction of drive, and is connected to the table through a power-hand clutch and a fast-slow clutch in series therewith, so that alternate fast and slow driving rates are available for either power or manual operation of the table.

In accordance with the invention, manually operable controls for the table are provided which include separate fast-slow selector controls for determining the position of the fast-slow clutch under alternative conditions of manual and power operation, and a power-manual control element which is arranged to shift the position of the power-manual clutch and at the same time to render one or the other of said selector controls operative to determine the rate of table travel. In order to permit a quick adjustment of the table for the desired rate of power operation, a control element for the field rheostat above mentioned, is provided, having a slow speed range and a high speed range indicator scale which provide for a direct adjustment of the motor speed for the desired rate of table travel with the fast-slow clutch in each of its high speed and low speed positions.

Another feature of the invention consists in the provision of a novel arrangement of the manual controls for starting and stopping the table, and for stopping the table at the end of its travel in either direction.

Reciprocation of the table is controlled by means of reversing dogs on the table which cooperate with a reversing lever to reverse the table motor. In accordance with one feature of the present invention, a novel arrangement of reversing switches and operating connections therefor from the reversing lever is provided which is particularly well adapted to limit the overrun of the table upon reversal within ascertainable limits. The connections provided comprise a right and left limit or reversing switch, and right and left slow-down switches which are controlled by means of a cam actuated by the movement of the reversing lever from one operating position to the other. With the arrangement described, each of the slow-down and reversing switches is rendered operative when the reversing lever reaches a predetermined angular position, so that the table is electrically slowed and then stopped in a position which corresponds to the angular position reached by the reversing lever, and may be determined within narrow limits through the operation of the electrical braking connections hereinafter described.

In order to provide a positive limit for movement of the table in each direction where it may be desired to move the grinding wheel beyond the normal stop position against or closely adjacent a shoulder on the work, two positive stops are provided on the machine frame, which are arranged to engage with and positively stop movement of the table and reversing lever in each direction when moved manually an appreciable distance beyond the normal stop position. With the present construction, the table slow-down switches are connected to slow down the table only when the fast-slow clutch is in its high speed position.

Further in accordance with the present invention, the electrical devices for controlling the operation of the table are constructed and arranged to provide a dwell in table operation at reversal, said devices in the preferred form of applicant's construction being adjustable to vary or, if so desired, to entirely eliminate the table dwell at each end of its travel in each direction.

The several features of the present invention consist also in the devices, combinations and arrangement of parts hereinafter described and claimed, which together with the advantages to be obtained thereby will be readily understood by one skilled in the art from the following description taken in connection with the accompanying drawings, in which

The machine illustrated in the drawings as embodying in a preferred form the several features of the present invention, comprises a base 102, a work supporting table 104 which is arranged to slide in ways 106 on the base, a head stock bracket 108 adjustably secured on the table, a foot stock 110 also carried on the table, and a grinding wheel carriage 112 which is supported on cross ways (not shown) on the base.

Figure 2:
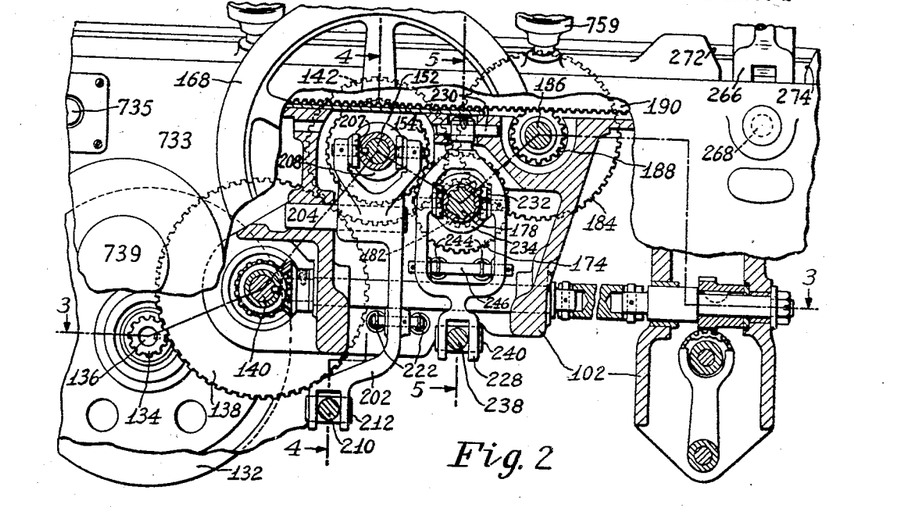
Fig. 2 is an enlarged view in front elevation illustrating particularly the table drive, overlying portions of the machine having been broken away to show underlying parts.
Figure 3:
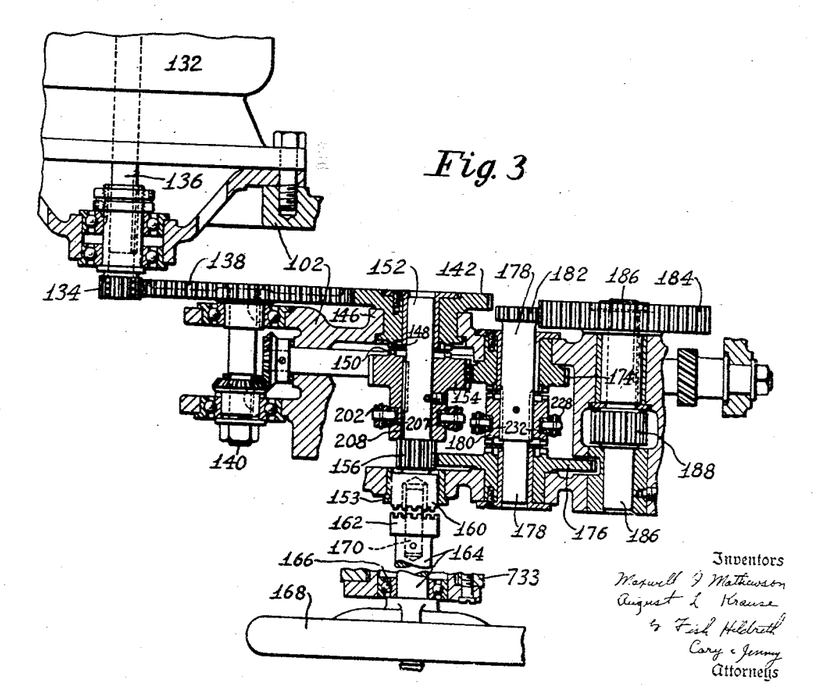
Fig. 3 is a sectional view taken substantially on the line 3—3 of Fig. 2, being a somewhat modified plan view of the table driving connections.

The work supporting table is driven from a variable speed reversible direct current motor 132 as best shown in Figs. 2 and 3 of the drawings, through driving connections which comprise a pinion 134 mounted on the armature shaft 136 of the motor to mesh with a gear 138 secured to a rotatable shaft 140. The gear 138 meshes also with a sleeve driving gear 142 which is externally supported in a bearing 146, and has formed at the inner or forward end thereof a clutch face 148 for engagement with a cooperating clutch surface 150 carried on the shiftable element of the power-manual clutch. The shiftable clutch element referred to, takes the form of a shaft 152 supported for axial and rotational movements at one end within the sleeve hub of the gear 142 and at its other end in a bearing 153 on the machine frame. Rigidly secured to the shaft 152 is a high speed driving gear 154 which has formed thereon the clutch face 150, and a slow speed driving gear 156.

In order to provide for the manual operation of the table, there is formed on the end of the shaft 152 a clutch face 160 which is arranged to engage with a clutch member 162 formed on the adjacent end of a hand wheel shaft 164 in axial alignment therewith. The shaft 164 is supported in bearings 166 in the machine frame, and carries at its outer end a table traversing hand wheel 168. At its inner end the shaft 164 is provided with an axially extending pin 170 which extends into an axial bore in the abutting end of the shaft 152 to maintain the two shafts in axial alignment.

The gears 154 and 156 mesh respectively with gears 174 and 176 which are loosely mounted to turn on a rotatable shaft 178, and form respectively the fast and slow driving elements of a fast-slow clutch unit. A driven clutch element 180 is splined to the shaft 178 between the driving gears 174 and 176, and is arranged for axial movement in either direction to engage alternatively with cooperating clutch members formed on the adjacent faces of the driving gears. A pinion 182 also secured to the shaft 178 meshes with a gear 184 secured to a drive shaft 186 which also carries the table driving pinion 188, which in turn meshes with a rack 190 formed on the underside of the table. With this construction and arrangement of parts, it will readily be seen that the table may be connected alternatively for power or manual operation by an axial shifting of the power-manual clutch shaft 152 including the gears 154 and 156. The table may then be driven selectively at a high or low rate of speed either by power or manually in accordance with the position of the fast-slow clutch 180 as desired.

Figure 4:
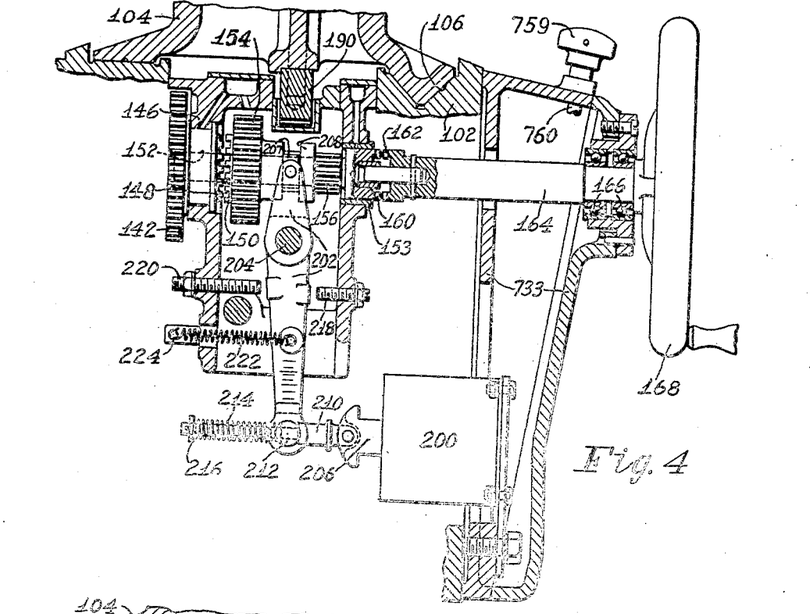
Fig. 4 is a sectional view taken on the line 4—4 of Fig. 2, to illustrate particularly the power-manual clutch and solenoid control therefor.

The position of the power-manual clutch for the table is controlled from an electrical control system for the machine hereinafter to be described, by means of a solenoid 200 and a clutch actuating lever 202 (see Figs. 2 and 4) which is mounted to turn on a pivot shaft 204, and is connected at one end to the solenoid armature 206, and at its other end to the axially movable clutch shaft 152. The lever 202 is connected at its upper end to the clutch by means of two bearing blocks 207 which are pivotally supported on the forked upper end of the lever to engage in a peripheral groove formed in the sleeve hub 208 of the gear 154 rigidly secured to the clutch shaft 152. At its lower end the clutch lever 202 is connected to the solenoid armature 206 by means of a link 210 which is pivotally connected at one end to the armature, and is provided with a reduced portion which extends through a bore formed in a cross pin 212 supported in the forked lower end of the clutch lever. A compression spring 214 coiled about the reduced portion of the link 210 between a collar 216 and the cross pin 212, tends to maintain the clutch lever 202 yieldingly against an abutting shoulder on the link 210. The movement of the clutch lever 202 in either direction is limited by engagement with adjustable stop pins 218 and 220 screw-threaded into the machine casing, and arranged for contact with opposite sides of the lever. Two tension springs 222 connected at one end to the clutch lever 202, and at their other ends to a pin 224 on the frame, tend normally to swing the clutch lever in a clockwise direction as shown in Fig. 4, to shift the clutch in a direction to disengage the power clutch member 148 and to engage the hand wheel clutch 162. With this construction and arrangement of the parts, the energizing of the solenoid 200 will cause the clutch lever to be shifted in a counterclockwise direction against the pressure of the spring 222 to disengage the hand wheel clutch element 162 and to engage the power clutch member 148 for power operation of the table. The yielding connection provided by the spring 214 between the solenoid armature 206 and the clutch lever 202, permits the armature 206 to be moved immediately to power position upon energizing the solenoid, and thus to avoid possible injury thereto, although the actual shifting of the clutch may be delayed while the clutch teeth are brought into alignment.

Figure 5:
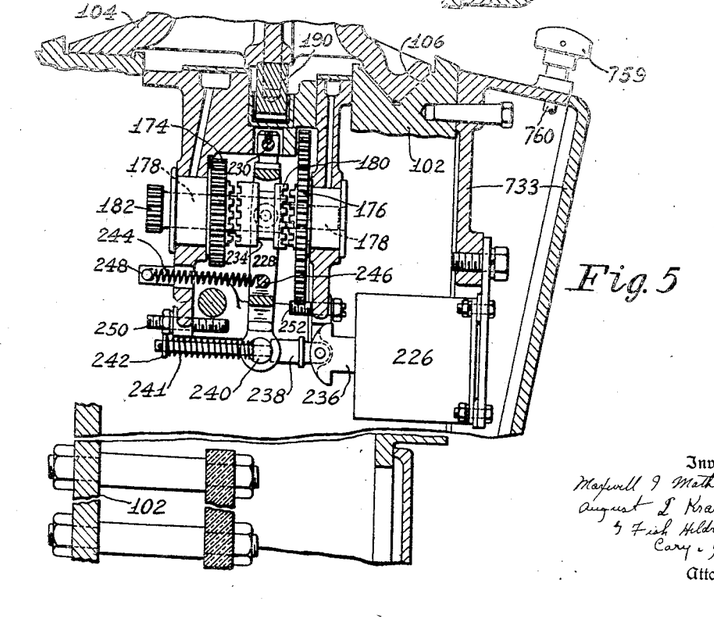
Fig. 5 is a sectional view taken on the line 5—5 of Fig. 2, illustrating particularly the table slow-fast clutch and solenoid control therefor.

The position of the slow-fast clutch member 180 is controlled from the electrical control system for the machine, by means of a solenoid 226 and a clutch actuating lever 228 (see Figs. 2 and 5) which is pivotally hung from a pivot pin 230. The clutch lever 228 takes the form of a frame on which are supported bearing blocks 232 arranged for engagement in a peripheral groove 234 formed in the clutch member 180. At its lower end the clutch lever 228 is connected to the armature 236 of the solenoid 226 by means of a link 238 having a reduced portion which extends through a bore formed in a cross pin 240 supported in the forked lower end of the clutch lever. A yielding connection is provided between the clutch lever 228 and armature 236 by means of a compression spring 241 which is coiled about the reduced portion of the link 238 between a collar 242 on the end thereof, and the cross pin 240, so that the lever 228 and cross pin 240 are held yieldingly against an abutting shoulder formed on the link 238. The fast-slow clutch 180 is normally held in its fast position by means of two parallel tension springs 244 which are connected at one end to a cross pin 246 on the lever 228, and at their other ends to a pin 248 on the machine frame. The movement of the clutch lever 228 in either direction is limited by means of adjustable stop pins 250 and 252 screw-threaded into the machine frame.

Figure 1:
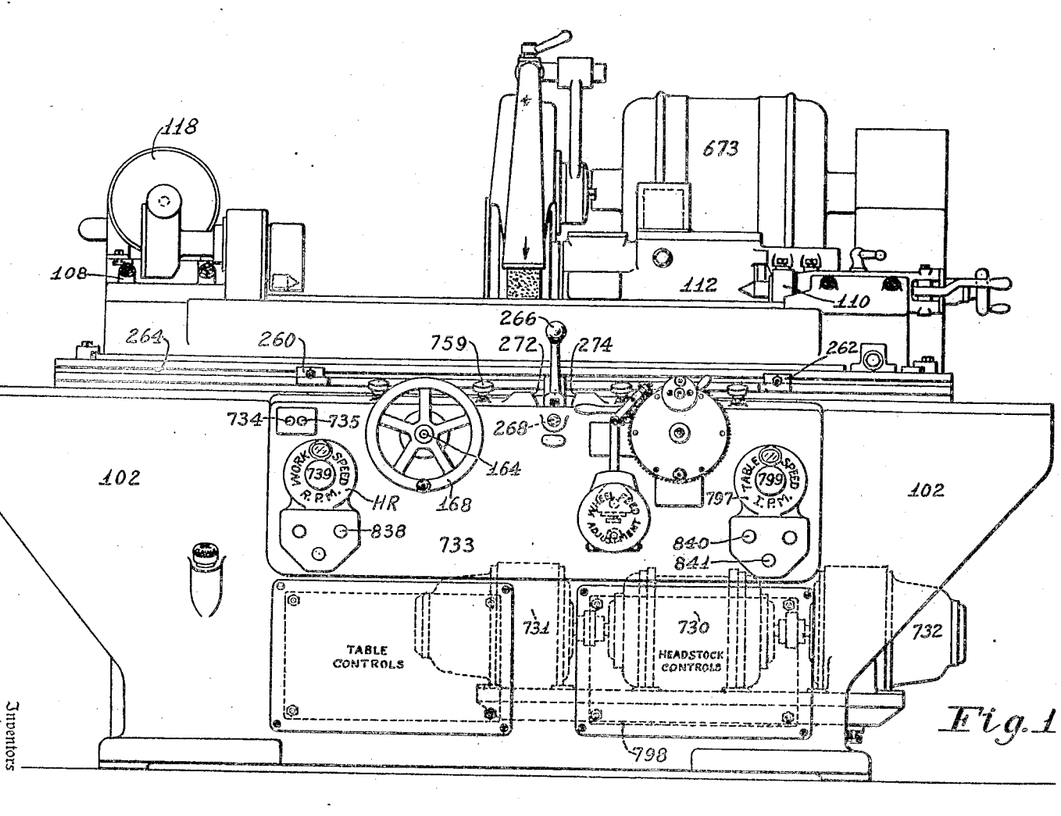
Fig. 1 is a view in front elevation of a grinding machine embodying the several features of the invention.
Figure 6:
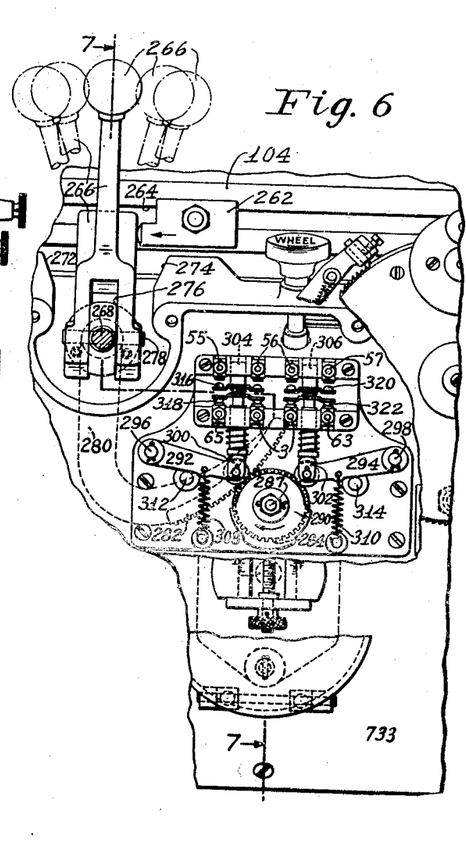
Fig. 6 is an enlarged detail view in front elevation with certain overlying parts broken away to illustrate particularly the reversing lever and reversing switch mechanism therefor, the parts being illustrated in a hypothetical halfway position.
Figure 7:
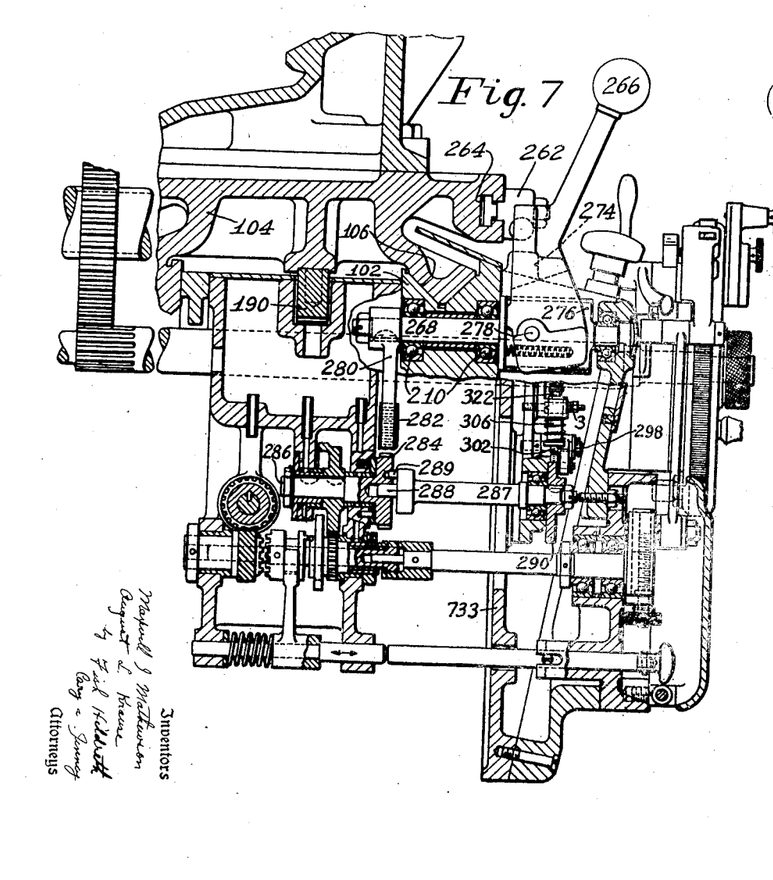
Fig. 7 is a sectional view taken on the line 7—7 of Fig. 6.

The reciprocation of the work table is controlled by means of table dogs and a reversing lever which operate through switch connections hereinafter to be described, to stop and thereafter to reverse the direction of rotation of the table motor 132. Two reversing dogs 260 and 262 are provided as best shown in Figs. 1, 6 and 7, adjustably mounted in a T-shaped slot 264, and arranged for engagement with a reversing lever 266 supported on a rock shaft 268 carried in bearings 270 on the machine frame. There are also provided on the machine frame at each side of the reversing lever, two stop lugs 272 and 274 to positively limit the swinging movement of the lever in either direction under the influence of the reversing dogs, so that a positive stop is provided for the travel of the table in either direction. The reversing lever 266 is bifurcated to fit over a flattened portion 276 formed on the rock shaft 268, and is pivotally connected thereto by means of a cross pin 278, so that the lever may be swung forwardly out of the path of the reversing dogs, to permit manual operation of the lever independently of the dogs. Secured to the rock shaft 268 is a downwardly extending hook-shaped lever arm 280 which has formed thereon a gear segment 282 arranged for engagement with a pinion 284 secured to a control shaft 286 which is supported in bearings on the machine frame in parallel relation to the rock shaft 268. With the connections above described, the movement of the reversing lever 266 from one operating position to the other, will cause a corresponding rotational movement to be imparted to the control shaft 286 in an opposite direction by an amount which will depend exactly upon the amplitude of movement of the control lever 266. The oscillatory movements of the control shaft 286 are utilized to operate a table slow-down and reversing switch to reverse the direction of drive of the table motor, and also to impart an intermittent advancing movement to the cross feed pawl hereinafter to be described.

The switch connections which are controlled by the movement of the reversing lever 266 from one operating position to the other (see Figs. 6, 14 to 18 inclusive, and 20) comprise a right slow-down switch contact 55—56 and a left slow-down switch contact 56—57 which operate to slow the motor and table driven thereby to a predetermined slow rate, and a right limit switch contact 3—63, and a left limit switch contact 3—65, which operate thereafter to reverse the motor and direction of table movement. The switch actuating connections comprise a cam 290 on a cam shaft 287 which is mounted in axial alignment with the control shaft 286 and is keyed to turn therewith. The shaft 287 is supported adjacent one end thereof in a stationary bearing in the machine frame, and at its other end is provided with an axially extending pin 288 which extends into an axial bore in the end of the control shaft 286. A pin 289 carried on an enlarged head on the shaft 287, engages with a corresponding aperture formed in the face of the gear 284, so that the cam shaft 287 is keyed to rotate therewith. Two identical switch actuating levers 292 and 294, pivoted respectively at 296 and 298 on the machine frame, are provided at their free ends with cam rolls arranged for engagement with the cam, and lugs 300 and 302 which are yieldingly engaged by two downwardly pressed switch plungers 304 and 306 for actuating the switch connections for reversing the direction of drive of the table motor. Two tension springs 308 and 310 connected respectively to the switch levers 292 and 294 tend normally to move the levers downwardly into engagement with the switch cam 290. Stop pins 312 and 314 serve to limit the downward movement of the levers. The switch plunger 304 carries two switch contactors 316 and 318 which are constructed and arranged so that when the plunger 304 occupies an intermediate position as the switch lever 292 rides on the intermediate level of the switch cam 290, both are closed. The movement of plunger 304 to its high position under the influence of the cam 290 causes the contactor 318 to move away from and open the switch contact 3—65, the movement of the plunger 304 to its low position conversely causing the contactor 316 to move away from and open the switch contact 55—56. The switch plunger 306 is similarly provided with two contactors 320 and 322 which are similarly controlled to close both contactors for an intermediate position of the switch plunger 306, and to open alternatively the left slow-down contact 56—57 or right limit switch contact 3—63 as the plunger is moved to its low or high position.

Figures 14, 15, 16, 17, 18:
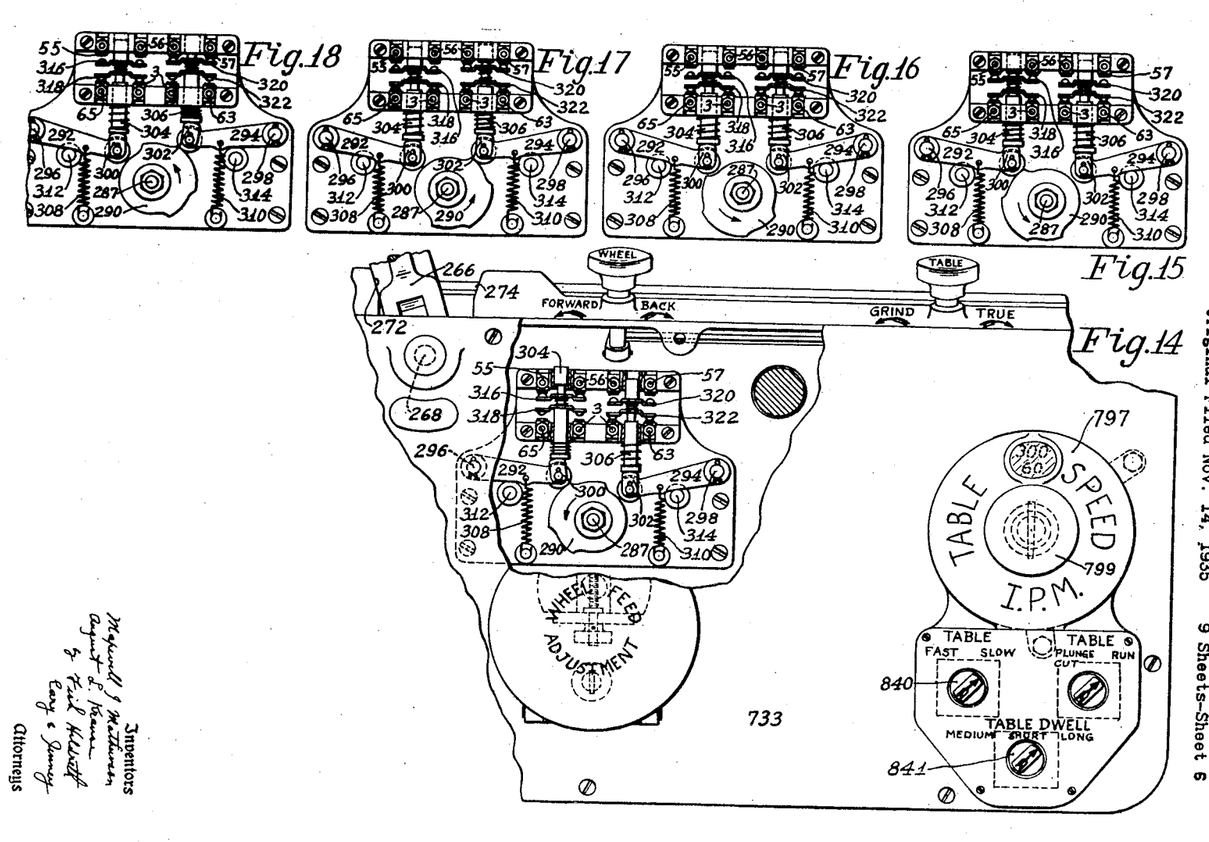
Fig. 14 is an enlarged view in front elevation of the right hand half of the control panel for the machine, a portion of the panel being broken away to show particularly the table slow-down and limit reversing switches.
Figs. 15 to 18 inclusive, are similar views of the table switch connections illustrated in Fig. 14, and with Fig. 14 illustrate in five successive steps the positions taken by said switch connections during the movement of the reversing lever to reverse the direction of table drive from right to left.

The operation of the reversing lever 266 and reversing switch connections controlled thereby, will be readily understood from an inspection of Figs. 14 to 18 inclusive, which illustrate five successive positions of the switch connections taken as the reversing lever is shifted to reverse the direction of table travel from right to left. As shown in Fig. 14, the reversing lever is in its extreme position to the left prior to the engagement of the dog 260 therewith. For this position of the reversing lever 266, the cam 290 has been rotated in a clockwise direction so that the plunger 304 is fully raised under the influence of the high portion of the cam, and the plunger 306 is fully depressed under the influence of the low portion of the cam 290. For this position of the parts, the right slow-down switch contact 55—56 and the right limit switch contact 3—63 are closed. The movement of the reversing lever 266 upon engagement of the table dog 260 therewith, now causes the cam 290 to rotate in a counterclockwise direction. As shown in Fig. 15, the switch lever 292 is moved onto the intermediate level of the cam 290, causing the left limit switch 3—65 to be closed, but without otherwise altering the operating conditions electrically. As shown in Fig. 16, the switch plunger 304 is now moved to its retracted position as the switch lever rides from the intermediate to the low portion of the cam 290, causing the contact 316 to be disengaged from the right slow-down contact 55—56 to shift the motor to slow speed. The continued rotation of the cam 290 as the reversing lever 266 swings still further towards its limiting position to the right, now causes the switch lever 294 to ride onto the intermediate portion of the cam 290 as shown in Fig. 17, to close the left limit switch contacts 56—57, and subsequently, as the switch lever 294 rides onto the high portion of the cam 290, to disengage the switch contactor 322 from the right limit switch contact 3—63, causing the motor to be reversed. In order to shift the table travel from the left to right, the operation is exactly the reverse. The opening of the left slow-down switch contact 56—57 will cause the motor to be slowed to a predetermined speed, and the subsequent opening of the left limit switch contact 3—65 will again reverse the direction of rotation of the table motor. In order to permit the braking torque of the motor to bring the table smoothly to a stop upon reversal, and also to permit a certain amount of variation in the overrun of the table in either direction, the cam 290 and connections to the reversing lever 266 are so arranged as to permit a certain amount of overthrow of these parts after the motor has been reversed. The reversing lever 266 does not normally engage the stop abutments 272 and 274 during reversal. However, it is frequently desirable to stop the power operation of the machine at the end of its travel in either direction, and thereafter by manual operation thereof to bring the grinding wheel up to or briefly into contact with an abutting shoulder of the work. The engagement of the reversing lever 266 with one or the other of these stop abutments, will then operate to limit the continued manual movement of the table to bring the grinding wheel against the shoulder. The operation of the subsidiary electrical connections controlled by the opening of the switch slow-down and reversing contacts above described, to effect the corresponding changes in the operating conditions of the machine, will be further described in connection with the electrical diagram (Figs. 19 to 22 inclusive).

The machine disclosed in the drawings, is provided with an electrical control system having a number of novel features of construction and operation well adapted to insure an accurate and versatile control of the work supporting table for operation under a wide variety of operating conditions. These controls include power and manual fast-slow selector switches operative alternatively to control the rate of table travel depending upon the position of the power-manual clutch, a novel and improved starting, stopping and end stop control for the table, together with electrical connections arranged under certain operating conditions to provide a table slow-down and a table dwell upon reversal.

The electrical driving and operating controls for the table form a part of the electrical system for the entire machine. For clarity of illustration, the electrical diagram of the operating connections for the machine, is disclosed in its entirety in the drawings. In view of the full explanation of the electrical connections for the machine to be found in the copending application above referred to, these electrical controls will be described in the present instance only so far as is believed necessary to adequately describe the several features of applicants' present invention which relate specifically to the operation and control of the work supporting table.

The electrical driving units comprise several alternating current motors including the main grinding wheel spindle motor 673, the coolant pump motor 634, the lubricant pump motor 668, the cross feed rapid movement motor 570, and a generator motor 730 which is in turn directly connected to drive a headstock motor generator 731 and a table motor generator 732. The headstock generator is a constant potential self-excited generator which supplies the necessary power for running the headstock motor 118, and also supplies current to the direct current control circuit hereinafter to be described, and to the fields of all of the direct current motors and generators above mentioned.

The several manually operable controls for the machine are mounted on a control panel 733 which is mounted on the front side of the machine beneath the table. These controls include a machine Start button 734 and a Stop button 735 which operate to control the starting and stopping of the main spindle driving motor 673, the generator motor 730, the oil pump motor 668, and the coolant pump motor 634. The pushing of the Start button 734, as best shown in the electrical diagram illustrated in Figs. 19 and 20, and in the explanatory diagram Fig. 21, operates to close the contacts 75—83 to energize the starting switch solenoid 736, which in turn operates to close the main line contacts 75—87, 76—88 and 77—85, and also a holding switch contact 75—84. The pressing of Stop button 735 operates to open the contact 82—83 to de-energize the main switch solenoid 736, and thus to stop the machine.

Figure 22:
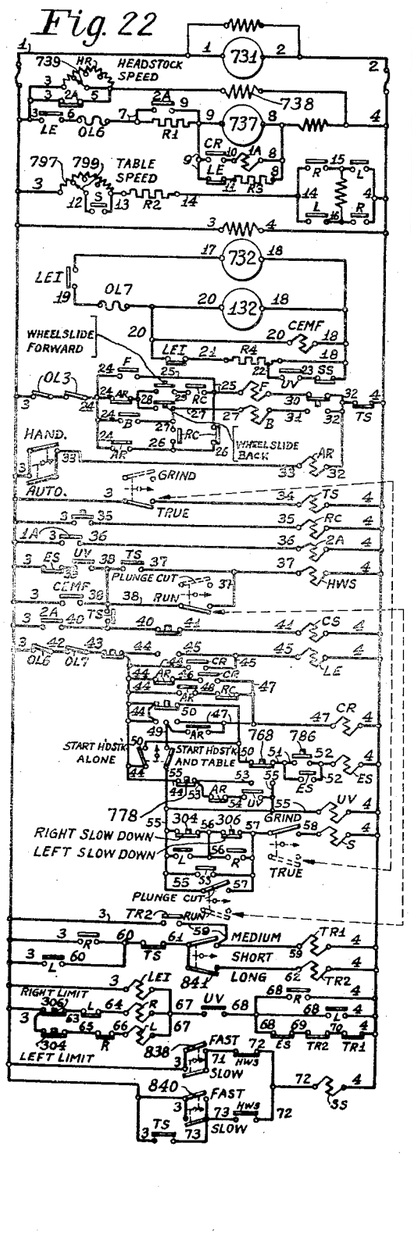

The starting of the generator motor 730 and headstock generator 731 operates immediately to supply current to the entire direct current control circuit which, as best shown in the explanatory diagram Fig. 22, comprises a supply line 1, 3 and a return line 2, 4. The headstock motor armature designated at 737 and the headstock motor shunt field 738 are connected across the supply and return wires 1, 2. In order to permit variations in the motor speed, a headstock field rheostat HR is provided in series with the shunt field 738. This rheostat is controlled by means of a knob 739 on the left side of the panel 733 to determine the driving rate of the headstock motor.

Figures 8, 12, 13:
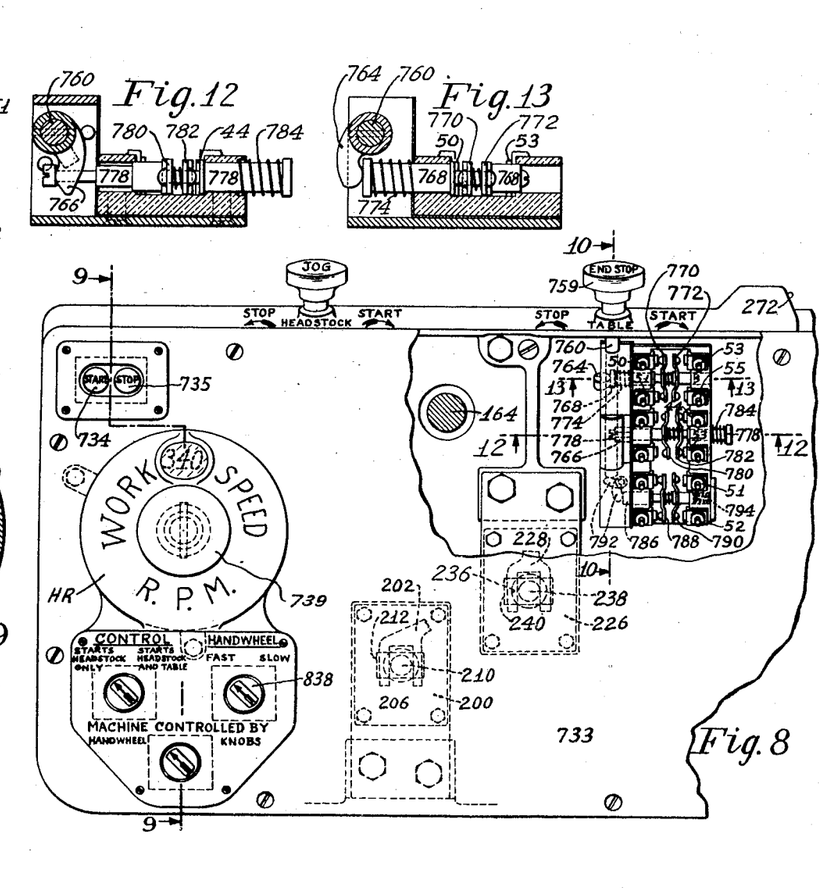
Fig. 8 is an enlarged view in front elevation illustrating particularly the left half of the control panel for the machine, a portion thereof being broken away to illustrate particularly the switches controlled by the table knob.
Fig. 12 is a detail sectional view looking from below taken on the line 12—12 of Fig. 8, to illustrate on an enlarged scale the table stopping switch.
Fig. 13 is a sectional view looking from below taken on the line 13—13 of Fig. 8, to illustrate particularly the table stopping switch.
Figures 9, 10, 11:
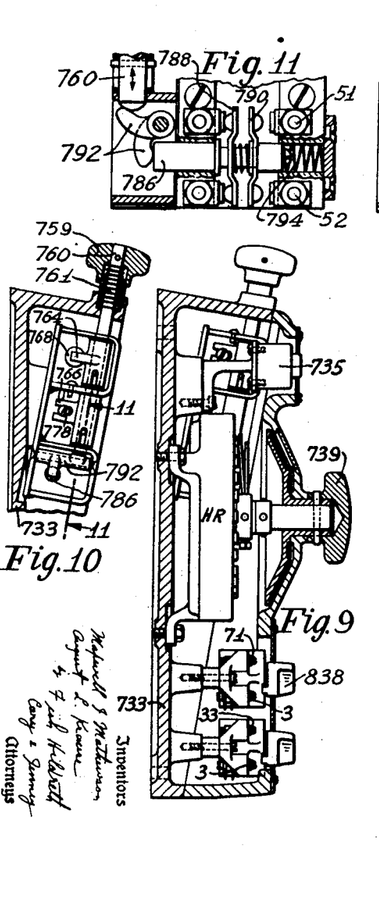
Fig. 9 is a sectional view taken on the line 9—9 of Fig. 8.
Fig. 10 is a sectional view taken on the line 10—10 of Fig. 8.
Fig. 11 is a sectional view taken on the line 11—11 of Fig. 10, illustrating on an enlarged scale the table end stop switch.

In accordance with the present invention, there is provided on the control panel 733, a table control knob 759 which is rotatable in a clockwise direction to start the table motor and table, and rotatable in an opposite direction to stop the table motor and disconnect the power drive. The table knob may also be pressed downwardly by the operator to cause the table motor to be stopped and the table drive to be disconnected when the table reaches the end of its travel in the direction in which it is moving at the time of pressing the knob. The table knob 759 is rigidly secured, as best shown in Fig. 8, to the upper end of a rotatable and axially movable switch control rod 760 which is held normally in a raised rest position by means of a compression spring 761 which is coiled about the control rod 760, and is seated at one end within a recess formed within the table knob 759, and at its other end within a recess formed in the panel casing 733. There are rigidly secured to the control rod 760, a table starting switch actuating arm 764 (see Figs. 8 and 13) and a stop switch control arm 766. The table starting switch comprises a plunger 768 which carries two switch arms 770 and 772 and is normally held in a rest position to the left in engagement with the lever arm 764, as shown in Fig. 8, by means of a compression spring 774, in which position the switch arm 770 engages the contacts 50—51. The table stop switch similarly comprises a switch plunger 778 having mounted thereon switch arms 780 and 782 and is provided at one end with an enlarged head which engages with a forked portion of the switch lever arm 766. A compression spring 784 tends normally to move the plunger to the right, as shown in Fig. 8, so that the switch arm 782 is normally positioned to close the contacts 44—53. The table end stop switch comprises a switch plunger 786 which carries switch arms 788 and 790 and is arranged to engage against one arm of a small bell-crank lever 792, the other arm of which engages the lower end of the table switch control rod 760. A compression spring 794 tends normally to maintain the switch plunger 786 to the left, as illustrated in Fig. 8, with the switch arm 790 out of engagement with the contacts 51—52.

Figure 19:
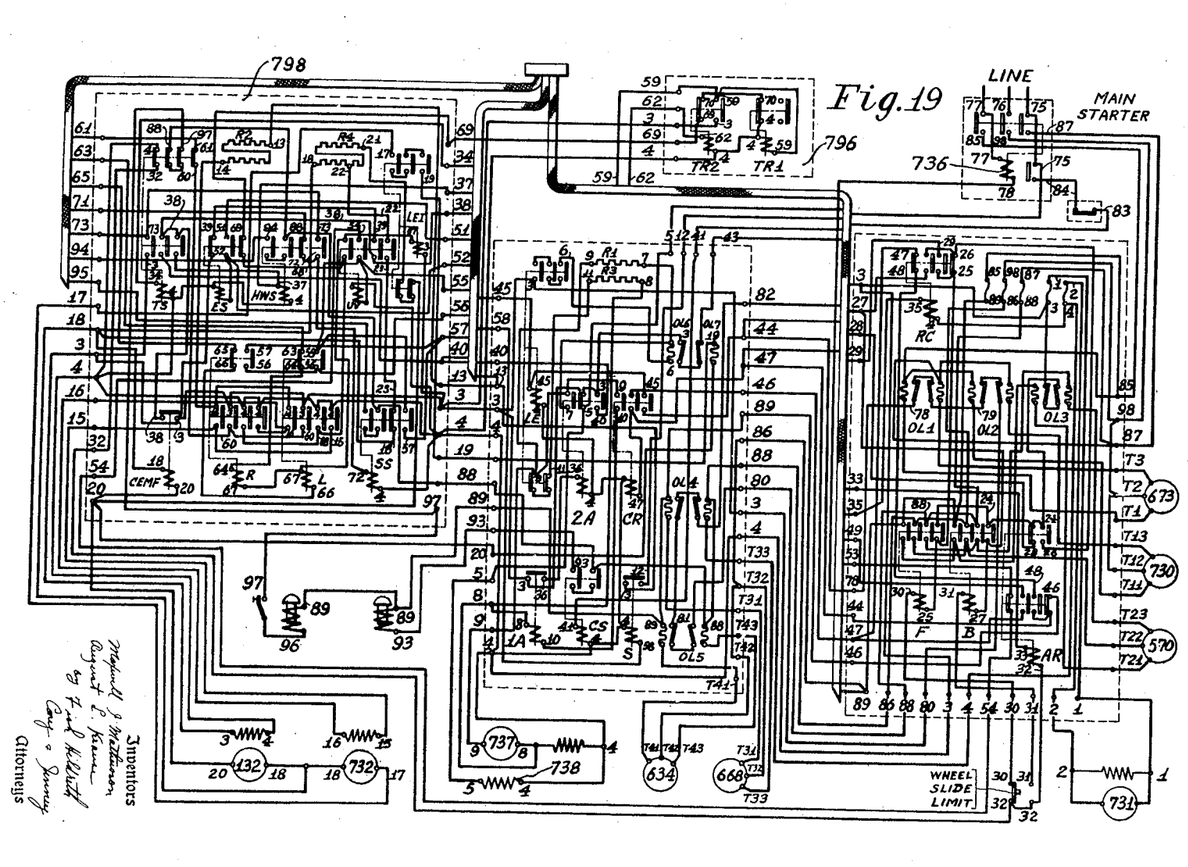
Figs. 19 and 20 constitute a wiring diagram of the electrical connections for the machine, Fig. 19 illustrating particularly the electrical connections on the machine control panel, and Fig. 20 illustrating subsidiary switch connections controlled thereby for controlling the operation of the several operating units of the machine.

The operation of the table motor is controlled from the table knob 759 and the starting and stopping switches above described by means of a number of secondary switch connections which include table dwell relays TR1 and TR2, generator field reversing contactors L and R, a hand wheel solenoid contactor HWS; under voltage contactor UV, table line and dynamic brake contactor LE1; counter electromotive forces relay CEMF; table slow speed contactor SS and a table slow-down contactor S. The table dwell relays TR1 and TR2 are carried on a panel 796 illustrated at the top of the wiring diagram Figure 19, the table slow-down contactor S is mounted on the panel 759, and the remaining of the above-mentioned switches are located on a panel 798, as best shown in Fig. 19.

For starting the table if it be assumed that the several controls of the machine, as fully described in the parent application above referred to, are set for Grind position, Knob control, Long dwell, and Run position, the turning of the table knob 759 in a clockwise direction causes the lever arm 764 to engage with and move the switch plunger 768 to the right to close the switch contacts 53—55 and simultaneously to open the contacts 50—51, thus energizing coil UV. Contact UV 67—68 closes, energizing LE1 and either L or R coil, depending upon the position of the reversing lever. It will be hereinafter assumed that coil R is energized. Contact UV 22—23 closes, decreasing the table dynamic braking resistance, and contact UV 38—39 closes, energizing coil HWS which in turn energizes the solenoid 200 to disconnect the hand wheel from the table and engage the table drive to the table motor 132. Contact LE1 17—19 closes, starting the table motor and energizing coil CEMF, and contact LE1 20—21 opens, disconnecting the dynamic braking resistor R4. Counter EMF 3—38 closes, contact R 65—66 opens, thus preventing coil L from becoming energized, contact R 68—4 closes a holding circuit to the LE1 and R coils, contact R 56—57 closes, energizing coil S, thus eliminating the table slow-down hereinafter to be described, and contacts R 14—15 and R 16—4 close, energizing the table generator field so that the table will traverse to the right. Contact R 3—60 closes, energizing coil TR2. Contact TR2 69—70 opens, and contact TR 3—59 closes, energizing coil TR1. Contact TR1 70—4 opens. The contacts TR2 69—70 and TR1 70—4 must both close before a table reversal can take place. Contact HWS 71—72 opens, disconnecting the hand wheel fast-slow selector switch, and contact HWS 73—72 closes, placing the power fast-slow selector switch in series with coil SS. Contact SS 12—13 closes, giving the table motor a speed, as determined by the table field rheostat 797. The setting of the rheostat 797 is controlled manually by means of a knob 799 on the panel 733 as best shown in Figs. 1 and 14.

If it is now desired to stop the table traverse to the right, the operator may turn the table control knob 759 to the left or in a counterclockwise direction to stop position, thus causing the switch lever arm 766 to move the switch plunger 778 to the left to disengage the switch contact 44—53 causing coils UV and S to be de-energized. Contact UV 54—55 opens to maintain coil UV in a de-energizing state, contact UV 67—68 opens de-energizing coils LE1 and R, contact UV 38—39 opens, and contact UV 22—23 opens, making the entire dynamic braking resistance available. Contact S 12—13 opens placing the total resistance of the rheostat in series with the table generator field. Contact LE1 17—19 opens, disconnecting the table motor, and contact LE1 20—21 closes connecting the dynamic braking resistance so as to bring the table motor to a rapid stop. Contact R 65—66 closes, contact R 68—4 opens, contact R 3—60 opens de-energizing coil TR2, contact R 56—57 opens, and contacts R 14—15 and R 4—16 open, de-energizing the table generator field. Contact TR2 69—70 closes, and contact TR2 3—59 opens, de-energizing coil TR1 and thus causing contact TR1 70—4 to close. The coil CEMF does not de-energize until the table motor has slowed down considerably. This holds the table drive clutch engaged with the motor during the stopping period. Contact CEMF 3—38 opens, de-energizing coil HWS. Contact HWS 88—94 opens, de-energizing the hand wheel solenoid which engages the hand wheel.

Assuming that the table is travelling to the right and that the reversing lever is shifted by engagement with the table dog 260 to reverse the direction of travel of the table, the movement of the reversing lever to the right, as best shown in Figs. 14 to 18 inclusive, first operates to open the right slow-down contact 55—56, as the switch plunger 304 moves to its low position following the movement of the cam lever 292 which passes from the intermediate to the low portion of the reversing switch cam 290. The opening of the switch contact 55—56 de-energizes the coil S so that contact S 12—13 opens to throw in the entire resistance of the rheostat 707 to drive the table at a predetermined low speed, slowing down the table motor. Subsequently, as the reversing lever nears the limit of its movement to the right, the right limit contact 3—63 opens as the switch plunger 306 of the reversing switch is moved to its highest position by the movement of the cam lever 294 onto the highest portion of the switch reversing cam 290, so that the coil R is de-energized. Contact R 65—66 now closes, contact R 56—57 opens, contacts R 14—15 and R 4—16 open de-energizing the table generator field, and contact R 3—60 opens de-energizing coil TR2. Coil LE1 is de-energized by the opening of contact R 68—4. Contact LE1 17—19 opens, stopping the table motor, and contact LE1 20—21 closes, forming a dynamic braking circuit which brings the table motor to a rapid stop. The CEMF coil is de-energized as the motor finally stops and contact CEMF 3—38 opens, de-energizing HWS coil which, in turn releases the hand wheel solenoid. Assuming a long dwell position of the dwell adjusting switch designated at 841 in Figs. 1, 14 and 20, the continued operation of the subsidiary electrical connections will be as follows: After a predetermined length of time which may, for example, amount to three-quarters of a second after coil TR2 is de-energized, it operates to close contact TR2 69—70 and to open contact TR2 3—59, de-energizing coil TR1 which, after the further delay preferably adjusted to three-quarters of a second, operates similarly to close contact TR1 70—4. The closing of contact TR1 70—4 energizes coil LE1 and L. Contact LE1 17—19 closes, starting the table motor, and contact LE1 20—21 opens, disconnecting the dynamic braking resistance. Contact L 63—64 opens, making it impossible to energize coil R, contact L 68—4 closes holding circuit for coils LE1 and L, contact L 55—56 closes energizing coil S, thus eliminating the slow-down, contacts L 4—15 and L 14—16 close, energizing the table generator field in an opposite direction from that in which it was connected during the traverse to the right and contact L 3—60 closes energizing coil TR2. Contact S 12—13 closes, giving the table motor speed as controlled by the rheostat in the table generator field. Contact TR2 69—70 opens, and contact TR2 3—59 closes energizing coil TR1 causing contact TR1 70—4 to open.

Assuming that the table is travelling to the right and that it is desired to operate the end stop control to cause the table to stop when it reaches the limit of its travel to the right, the operator presses downwardly upon the table knob 759, closing the end stop switch contact 51—52. Assuming that the controls of the machine are set for Grind position, Knob control, Long dwell and Run position, the operation of the subsidiary switch connections to stop the table travelling to the right, will be as follows: The closing of the contact 51—52 energizes an end stop contactor coil ES supported on the panel 798 which is arranged to form a holding circuit for itself and to stop the table at the end of its stroke by holding the circuit open to the reverse contactors L and R after the limit switch has been operated, and permits the power-manual clutch to be shifted to hand wheel position. When coil ES is energized, the contact ES 51—52 closes, forming the holding circuit, contact ES 68—69 opens, and contact ES 3—39 opens. When the reversing lever is now moved to its reversing position by engagement with the table dog 260, coils LE1, R, TR1, TR2, CEMF and S are de-energized as previously described in connection with the reversal of the table drive. Contact CEMF 3—38 opens, de-energizing coil HWS, which causes the power-manual clutch to shift to hand wheel position. Contact TR2 69—70 closes, and contact TR2 3—39 opens after its dwell, de-energizing TR1. Contact TR1 70—4 closes after its dwell. The coils LE1 and L are not energized because of the open contact ES 68—69, leaving the table in its stop position at the extreme right.

Figure 20:
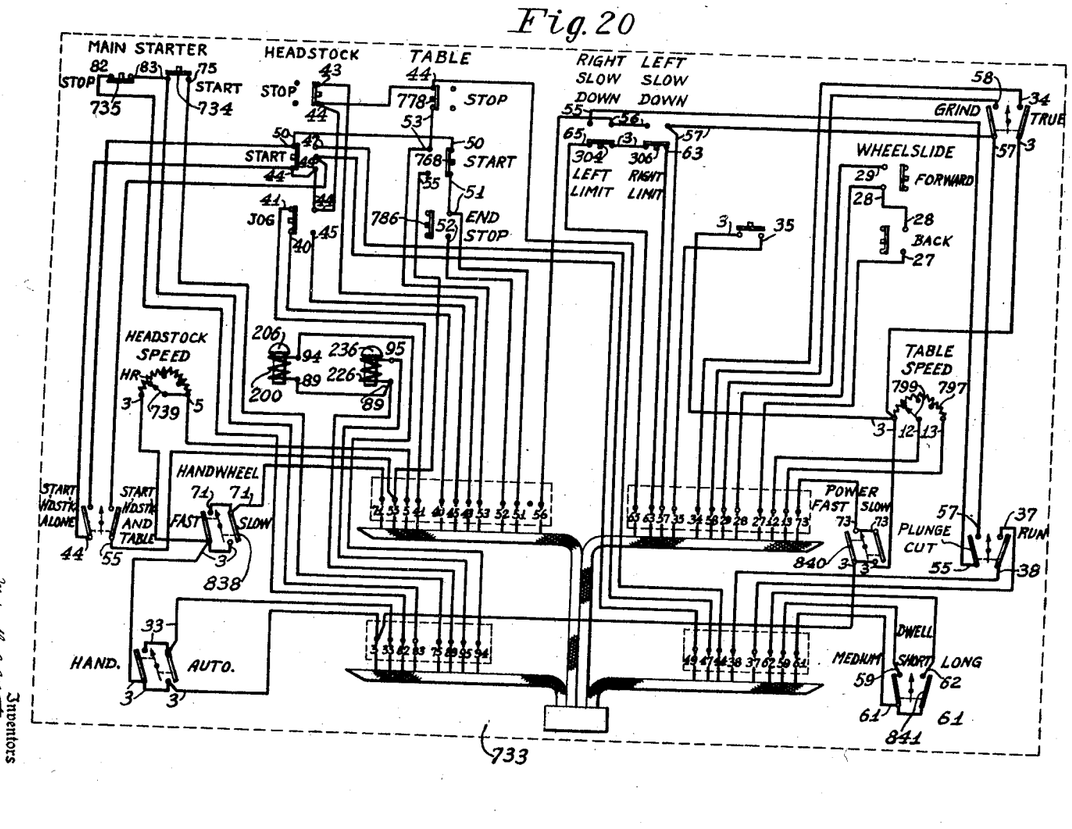
Figure 21:
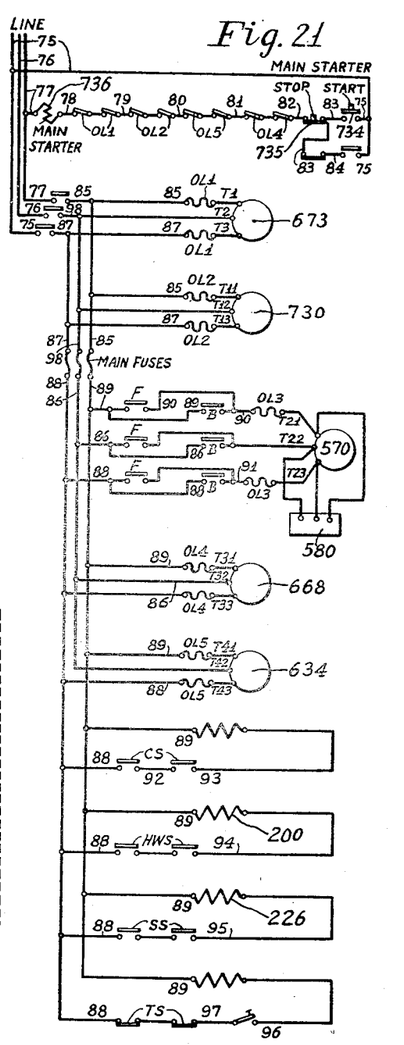
Figs. 21 and 22 constituting an explanatory diagram of the electrical connections, Fig. 21 being an explanatory diagram of the electrical connections for certain of the operating units, and Fig. 22 being an explanatory diagram more particularly of the direct current control circuit of the machine.

In accordance with another feature of the present invention, there is provided on the control panel 793 a hand wheel fast-slow selector switch member 898 which is arranged to control the position of the fast-slow clutch 180 to determine the rate of travel of the table during manual operation of the table hand wheel. This switch, as best shown in the electrical diagram 20, explanatory electrical diagram Fig. 22, is arranged for the fast position of the switch member 898 to break the contact 3—71 to de-energize the table slow speed contactor SS, thus causing the SS contact 90—95 to open, de-energizing the slow-fast clutch solenoid 226, so that the clutch is permitted to move to high speed position. The alternative slow position of the switch 898 operates to close the switch contact 3—71, energizing the slow speed contactor SS to close the SS contact 80—95 and energize the solenoid 226 to shift the clutch to slow speed position.

Also provided on the panel 733 is a table power fast-slow control switch 840 which is arranged to control the position of the fast-slow clutch 180 during the power operation of the table and has alternative operating positions corresponding to the fast and slow position of the clutch 180. The control switch 840 is arranged in fast position to open the switch contact 3—73 to de-energize the slow speed contactor SS which operates, as above described, to shift the fast-slow clutch 180 to fast position. The movement of the switch member 840 to slow position operates to close contact 3—73 to energize the slow speed contactor SS which, in turn, causes the clutch to be moved to its slow position.

The shifting of the table power fast-slow control switch 840 to slow position, operates also to disable the electrical connections above described, for slowing the table prior to reversal. The energizing of the slow speed contactor SS causes SS contact 55—57 to close, short-circuiting the right slow-down contactor 55—56 and the left slow-down contactor 56—57 to keep the slow-down contactor S energized during the continued operation of the table. The shifting of the control switch 840 to its fast position, will operate through the opening of SS contact 55—57, to bring the slow-down contactor S under the control of the slow-down switches. As previously set forth, the de-energizing of the slow-down contactor S through the operation of either the left or right slow-down switch, will operate to open S contact 12—13 to throw in the entire resistance of the table rheostat 797, thus slowing the table to a predetermined slow speed prior to reversal.

The control for slowing down the table prior to reversal when operating at one of the faster rates, has the specific advantage of establishing a predetermined set of operating conditions prior to reversal. The momentum of the table is thus greatly reduced, so that the dynamic braking of the table motor as above described, will operate to stop the table with a minimum of overrun, and in a position which can be determined with considerable accuracy. During operation of the table at one of the lower feed rates, in which the fast-slow clutch 180 is in its slow speed position, however, it has been found that the electrical braking of the table is effective to stop the table without excessive overrun. Under these conditions the elimination of the table slow-down to the extreme slow rate, effects a considerable saving in the time required for reversal at each end of the table travel.

Further in accordance with the present invention, switch connections are provided for selectively rendering the hand wheel or power fast-slow switch members 838 or 840 operative to control the position of the fast-slow clutch in accordance with whether the power-manual clutch is set for power or hand wheel operation of the table. To this end switch connections are provided in each of the hand wheel and power fast-slow selector switch circuits which are controlled from the hand wheel solenoid contactor HWS above described which operates when energized to energize the power manual clutch solenoid to shift the clutch to power position. HWS contact 73—72 is provided in series with the power fast-slow selector switch and HWS contact 71—72 is provided in series with the hand wheel fast-slow selector switch, these contacts being arranged so that the energizing of the HWS coil for power operation of the table operates to open HWS contact 71—72 and simultaneously to close HWS contact 73—72 to render the fast-slow clutch 180 subject to the power selector switch 840, and the de-energizing of the HWS coil to return the manual-power clutch 150 to hand wheel position similarly operates to open HWS contact 73—72 and to close HWS contact 71—72 to render the fast-slow clutch 180 subject to the hand wheel fast-slow selector switch.

It will be understood that the invention is not limited to the specific embodiment shown, and that various deviations may be made therefrom without departing from the spirit and scope of the appended claims.

What is claimed is:

1. In a grinding machine having a table reciprocable longitudinally for effecting relative translatory feeding movements of the grinding wheel and work, the combination with the table, of means for reciprocating the table between limiting positions at a uniform rate of travel and for stopping and for starting the table from said positions, said means including an element shiftable to bring said table to a quick stop, adjustable dogs on said table to actuate said shiftable element, and an electrically controlled mechanism to start movement of the table in the reverse direction after a predetermined period of dwell.

2. In a grinding machine having a table reciprocable longitudinally for effecting relative translatory feeding movements of the grinding wheel and work, the combination with the table, of means for reciprocating the table between limiting positions at a uniform rate of travel and for stopping and for starting the table from said positions, said means including an element shiftable to bring said table to a quick stop, adjustable dogs on said table to actuate said shiftable element, and an electrically controlled mechanism including a limit switch actuated by said shiftable element, an electrical time delay relay which is set in motion by said switch, and a solenoid which is energized by said time delay relay after a predetermined time interval to start the table moving in the reverse direction.

3. In a grinding machine having a table reciprocable longitudinally for effecting relative translatory feeding movements of the grinding wheel and work, the combination with the table, of a reversible electric motor connected to drive the table, means for controlling the motor to reciprocate the table between limiting positions at a uniform rate of travel, and for stopping and for starting the table from said positions, which comprises a shiftable element and means actuated thereby for braking the motor to bring the table to a quick stop, adjustable dogs on said table to actuate said shiftable element, and electrically controlled mechanism which is actuated in timed relation with said shiftable element to start the motor and table therewith moving in a reverse direction after a predetermined time interval.

4. In a grinding machine having a table reciprocable longitudinally for effecting relative translatory feeding movements of the grinding wheel and work, the combination with the table, of means for reciprocating the table between limiting positions at a uniform rate of travel and for stopping and for starting the table from said positions, said means including a reversible electric motor for reciprocating the table, a reversing lever, dogs on the table to actuate the lever, and electrical connections controlled by said lever including a limit switch actuated by said lever, and means rendered operative by the actuation of said switch for electrically braking the motor to bring the table to a quick stop, an electrical time delay relay which is set in motion by said switch, and a solenoid which is energized by said time delay relay after a predetermined time interval to start the motor moving in a reverse direction.

5. In a machine tool, the combination of a base, a movable support, driving connections for the support including a prime mover and connections therefrom for driving the support selectively at any one of a plurality of different rates, means for reversing the direction of support movement, a reversing lever on the base having alternate running positions, cooperating dogs carried on the support to actuate said lever, electrical devices for controlling support movement including slow-down switch connections rendered operative by movement of the lever from either operating position to reduce the rate of support movement, limit switch connections rendered operative by further movement of the reversing lever to stop support movement, and subsidiary switch connections including a time delay device actuated by said limit switch connections to start support movement in the reverse direction after a predetermined time interval.

6. In a grinding machine, a longitudinally movable table, a variable speed reversible electric motor for reciprocating the table, a reversing lever having alternative running positions, reversing dogs on the table, slow-down switch connections rendered operative by the movement of the lever from either operating position to reduce the speed of the motor, a limit switch actuated by the further movement of the reversing lever toward the alternate running position, means rendered operative by the actuation of said limit switch for electrically braking the motor to stop table movement, and a time delay relay actuated by said limit switch to start the motor in a reverse direction after a predetermined time interval.

7. In a grinding machine having a table reciprocable longitudinally for effecting relative translatory feeding movements of the grinding wheel and work, the combination with the table, of a reversible direct current motor connected to drive the table, means for controlling the motor to reciprocate the table between limiting positions at a uniform rate of travel and for stopping and for starting the table from said positions, which comprises a rheostat adjustable to produce a plurality of motor speeds, a reversing element and electrical means actuated thereby for applying a dynamic braking force to the motor to bring the table to a quick stop, dogs on the table to actuate said element, a table reversing circuit including reversing switch connections shiftable to reverse the motor, electrical means actuated in timed relation with said shiftable element for delaying the shifting of said reversing switch connections to provide a predetermined dwell in the table movement upon reversal, and a manually adjustable control device for varying the amount of said dwell.

8. In a machine tool, the combination of a base, a movable support including a prime mover, means for varying the rate of support movement, means for reversing the direction of support movement, and control devices for the support comprising a reversing lever having alternative running positions and cooperating reversing dogs rendered operative by support movement for shifting the lever from one to the other of said positions to reverse the direction of support movement, a slow-down control including connections actuable by movement of said reversing lever from one position past a predetermined angular position to reduce the rate of support movement to a predetermined slow rate, and a reversing control including connections actuable by continued movement of the reversing lever in the same direction under the influence of a reversing dog to reverse the direction of support movement.

9. In a machine tool, the combination of a base, a movable support including a prime mover, means for varying the rate of support movement, means for reversing the direction of support movement, and control devices for the support comprising a reversing lever having alternative running positions and cooperating reversing dogs rendered operative by support movement for shifting the lever from one to the other of said positions to reverse the direction of support movement, a slow-down control including connections actuable by the movement of said reversing lever in one direction past a predetermined angular position to reduce the rate of travel of the support, and a reversing control including connections actuable by the continued movement of the reversing lever in the same direction to reverse the direction of support travel at the faster rate.

10. In a machine tool, the combination of a base, a movable support, driving connections for the support including a prime mover, variable speed devices for driving the support selectively at any one of a plurality of different rates, means for reversing the direction of support movement, and control devices for the support comprising a reversing lever on the base having alternate running positions, cooperating reversing dogs carried on the support to actuate said reversing lever, and slow-down and reversing controls for the support including connections actuable by movement of said reversing lever from one operating position past a predetermined position to establish a predetermined low rate of movement of the support, and actuable by the continued movement of the reversing lever a predetermined further distance toward the other of said positions to reverse the support.

11. In a machine tool, the combination of a base, a movable support, driving connections for the support including a variable speed reversible electric motor, and control devices for the support comprising a control element movable between alternative operating positions and dogs for actuating said element relatively located on the support and on said base to control the movement of the support, switch connections controlled by the actuation of said control element from one toward the other of said positions to reduce the motor speed to a predetermined slow rate, and limit switch connections actuated by continued movement of said control element to said other position for electrically braking the motor to arrest support movement.

12. In a machine tool, the combination of a base, a movable support, driving connections for the support including a reversible electric motor, a reversing switch for the motor, means for varying the motor speed, and control devices for the support comprising a reversing lever having alternative running positions and cooperating reversing dogs relatively located on the support and on said base to control the movement of the support, switch connections rendered operative by the movement of the reversing lever a predetermined distance from either operating position to reduce the speed of the motor, and switch connections rendered operative by further movement of the reversing lever toward the alternate running position to electrically reverse the motor.

13. In a machine tool, the combination of a base, a movable support, driving connections for the support including a variable speed reversible electric motor, a reversing switch for the motor, electrical connections for actuating said motor at a plurality of predetermined rates, shiftable means in said driving connections for driving the support from the motor at fast or slow rates, and control devices for the support comprising a reversing lever on the base having alternate running positions, cooperating reversing dogs carried on the support to actuate said reversing lever, connections rendered operative by the movement of said reversing lever from either operating position to the other to electrically reverse the motor, and switch connections rendered operative by the adjustment of said shiftable means to fast position and controlled by the movement of the reversing lever from either operating position to drive the motor at a predetermined slow rate, and thereafter to electrically reverse the motor at the rate established by said motor variable speed control.

14. In a machine tool, the combination of a base, a movable support, driving connections for the support including a reversible electric motor, shiftable means in said driving connections for driving the support from the motor at a fast or slow rate, and control devices for the support comprising a reversing lever, and means controlled by support movement for reversing the lever, motor reversing limit switches actuated by the lever, electrical connections for slowing the motor prior to reversal, and means operative upon a shift in said connections to drive the support from the motor at the slow rate to disable said electrical connections for slowing the motor.

15. In a machine tool, the combination of a base, a reciprocable support, a prime mover, and connections therefrom for driving the support, a reversing lever on the base having alternative running positions, cooperating reversing dogs on the support, connections rendered operative by the shifting of the reversing lever by said dogs to brake to a stop and thereafter to reverse the direction of support movement, an end stop control for said braking and reversing connections to stop the support in said brake-stop position, manually operable means for moving the support, and stops on the base for positively limiting the continued angular movement of the reversing lever spaced to permit a limited manual movement of the support beyond said brake-stop position.

16. In a machine tool, the combination of a base, a reciprocable support, driving connections for the support including a reversible electric motor, reversing switch connections for the motor, and control devices for the support comprising a reversing lever on the base having alternative running positions, and cooperating reversing dogs on the support to actuate the reversing lever, means rendered operative by the movement of the reversing lever in either direction for actuating said reversing switch connections to electrically brake the support to a stop and to reverse the direction of support movement, an end stop control for said reversing switch connections to stop the support in said brake-stop position, manually operable means for moving the support, and stops on the base for positively limiting the continued angular movement of the reversing lever spaced to permit a limited manual movement of the support beyond said brake-stop position.

17. In a machine tool, the combination of a base, a movable support, driving connections for the support including a reversible electric motor, and control devices for reversing the support comprising a reversing lever on the base having alternative running positions and cooperating reversing dogs on the support to actuate the reversing lever, a switch cam and connections from the reversing lever for moving the cam in opposite directions, said cam having symmetrically arranged actuating surfaces, subsidiary connections including left and right slow-down switches and left and right limit reversing switches, and cam follower connections rendered operative by movement of the lever and cam in one direction to actuate the left slow-down switch and thereafter the left limit reversing switch, and upon movement of the lever and cam in a reverse direction to actuate the right slow-down switch and thereafter the right limit reversing switch.

18. In a machine tool, the combination of a base, a reciprocable support, driving connections for the support including a reversible electric motor, and control devices for reversing the support comprising a reversing lever on the base having alternative running positions, and cooperating reversing dogs on the support to actuate the reversing lever, a rotatable switch cam and connections from the reversing lever for rotating the cam in opposite directions, said cam having two opposite symmetrically arranged actuating surfaces, subsidiary connections including a cam follower engaging one of said surfaces, a left slow-down switch and a right limit reversing switch controlled thereby, a second cam follower engaging the other of said surfaces, a right slow-down switch and a left limit reversing switch actuated by the second follower, said cam and follower connections being arranged during the rotation of the cam with the reversing lever from one running position to the other first for moving said followers to operate the slow-down switch corresponding to the direction of table travel and thereafter to operate the corresponding limit reversing switch.

19. In a machine tool, the combination of a base, a reciprocable support, driving connections for the support including a reversible electric motor, and control devices for reversing the support comprising a reversing lever on the base having alternative running positions and cooperating reversing dogs on the support to actuate the reversing lever, a rotatable switch cam and connections from the reversing lever for rotating the cam in opposite directions, said cam having a central low portion and an intermediate and high portion symmetrically arranged on each side thereof, a cam follower cooperating with each of said rise portions, a left slow-down switch and a right limit reversing switch connected upon movement of the follower to the high portion of the cam to actuate the limit reversing switch, and upon movement of the follower to the central low portion of the cam to actuate the slow-down switch, a second cam follower engaging the opposite rise portion of the cam, a right slow-down switch and a left limit reversing switch, and connections rendered operative by movement of the second follower onto the high portion of the cam to actuate said left limit reversing switch, and upon movement of the follower to the low portion of the cam to actuate the right slow-down switch.

20. In a grinding machine, the combination with a machine base, a reciprocable work table carried thereby, a prime mover and connections therefrom for driving the table, means for reversing the table comprising a reversing lever on the base and cooperating reversing dogs on the table, and control devices for starting and stopping the table comprising a manually operable controller, connections rendered operative by the movement of the controller in one plane to connect said prime mover to drive the table, or to disconnect the prime mover to stop the table movement, and connections rendered operative by the movement of the controller in another plane and controlled by the reversing lever to disconnect the prime mover to stop the table at the end of its travel.

21. In a grinding machine, the combination with a machine base, a reciprocable work table carried thereby, a reversible electric motor for driving the table, a reversing lever mounted adjacent the table, reversing dogs on the table for actuating the lever, reversing switch connections rendered operative by the movement of the reversing lever from one operating position to the other to reverse the motor, a manually operable table starting switch, subsidiary switch connections controlled thereby connecting the motor for continued operation under the control of said reversing lever, a manually operable stop switch for the motor, a manually operable end stop switch, and switch connections controlled by said end stop switch to stop the motor when the table reaches the end of its travel.

22. In a grinding machine, the combination with a machine base, a reciprocable work table, a reversible electric motor for driving the table, means controlled from the table for reversing the motor to reverse the direction of table travel, a manually operable controller, switch connections rendered operative by the movement of the controller in one plane to connect the motor for continued operation under the control of said table reversing means or to stop the motor, and end stop switch connections rendered operative by the movement of the controller in another plane to stop the motor when the table reaches the end of its travel.

23. In a grinding machine, the combination with a machine base, a reciprocable work table, a reversible electric motor for driving the table, means controlled from the table for reversing the motor to reverse the direction of table travel, a manually rotatable and axially movable control knob, spring means tending to maintain the knob in a predetermined angular and axial position, switch connections including a holding circuit rendered operative by the rotation of the knob in one direction to connect the motor for continued operation under the control of said table reversing means, a stop switch rendered operative by the rotation of said knob in an opposite direction to stop the motor, and end stop switch connections including a holding circuit rendered operative by an axial movement of the knob and controlled by said table reversing means to stop the motor when the table reaches the end of its travel.

24. In a grinding machine, the combination with a machine base, a reciprocable work table, driving connections including a reversible variable speed electric motor and a fast-slow clutch for driving the table, means controlled from the table for reversing the motor to reverse the direction of table travel, a manually operable table control including switch connections for starting and stopping the motor, a manually operable shifting device for the fast-slow clutch, a manually adjustable motor speed control including electrical connections to produce a wide range of motor speeds, and indicator means associated with the motor speed control having a table slow speed range indicator scale and a table high speed range indicator scale.

25. In a grinding machine, the combination with a machine base, a work spindle, a reciprocable work table, driving connections including a reversible variable speed electric motor and a fast-slow clutch for driving the table, a reversing lever on the base and cooperating dogs on the table, switch connections controlled from the reversing lever for reversing the motor, connections controlled from the reversing lever for slowing the motor to a predetermined slow speed prior to reversal, a manually operable table control including switch connections for starting and stopping the motor, a manually operable shifting device for the fast-slow switch and connections rendered operative upon shifting the clutch to slow position to disconnect said connections for slowing the motor, a manually adjustable motor speed control including electrical connections to produce a wide range of motor speeds, and indicator means associated with the motor speed control having a table slow speed range indicator scale and a table high speed range indicator scale.

26. A grinding machine having in combination with a bed, a reciprocable work supporting table member movable on the bed, driving connections for reciprocating the table member including a slow-fast clutch, power means for driving the table, manual devices for operating the table, a power-manual clutch for connecting said power drive or manual drive alternatively to the driving connections for the table including said slow-fast clutch, and control devices comprising a power feed selector device for determining the position of said slow-fast clutch, a manual feed selector device for determining the position of said slow-fast clutch, and means for controlling the position of said power-manual clutch acting simultaneously to render the corresponding one of said selector devices operative to determine the position of the slow-fast clutch.

27. A grinding machine having in combination with a bed, a reciprocable work supporting table member movable on the bed, driving connections for reciprocating the table member including a slow-fast clutch, power means for driving the table, manual devices for operating the table, electrical connections including a power feed selector element adjustable to shift said clutch alternatively for slow or fast power operation of the table, electrical connections including a manual feed selector element adjustable to shift said clutch alternatively for slow or fast manual operation of the table, and means to connect said driving connections for power or manual operation of the table, and simultaneously to position said slow-fast clutch in accordance with the setting of the corresponding operative power or manual speed selector element.

28. A grinding machine having in combination with a bed, a work supporting table movable on the bed, driving connections for the table including a reversible electric motor, a manually operable member for driving the table, a power-manual clutch shiftable to connect said motor and said manual driving means alternatively to the table, means for reversing the motor at the end of the table travel in each direction, a starting and stopping switch for the motor, electrically operated means for controlling the position of said clutch, and a manually operable device including subsidiary switch connections for operating said switch to start the motor and simultaneously to move said clutch to power position, and alternatively to stop the motor and simultaneously to return said clutch to manual position.

29. A grinding machine having in combination with a bed, a work supporting table movable on the bed, driving connections for the table including a reversible electric motor, a manually operable member for driving the table, a power-manual clutch shiftable to connect said motor and said manual means alternatively to the table, means for reversing the motor at the end of the table travel in each direction, a starting and stopping switch for the motor, electrically operated means for controlling the position of said clutch, a manually operable control device including subsidiary switch connections for operating said switch to start and stop the motor, subsidiary switch connections rendered operative upon starting the motor to move said clutch to power position, subsidiary switch connections rendered operative in stopping the motor to return the clutch to manual position, and including means to delay the operation of said latter subsidiary switch connections to shift the clutch until the motor has reached substantially zero speed.

30. In a machine tool, the combination of a base, a movable support, driving connections for the support, including a variable speed reversible electric motor and a fast-slow clutch for driving the support, and control devices for the support comprising means for adjusting the motor speed, means for shifting said clutch, a reversing lever, and means controlled by support movement for reversing the lever, means actuated by movement of the lever to slow the motor to a predetermined slow speed independently of said adjustment, motor reversing switches actuated by continued movement of the lever, and means controlled by the clutch shifting means to disable said means for slowing the motor when the clutch is shifted to slow position.

31. In a machine tool, the combination of a base, a movable support, driving connections for the support including a variable speed reversible electric motor, and control devices for the support comprising a control element and dogs for actuating said element relatively located on the support and on said base to control the movement of the support, switch connections controlled by the actuation of said control element by its dog to reduce the motor speed, and limit switch connections actuated by continued movement of said control element by its dog to arrest support movement.

32. In a machine tool, the combination of a base, a movable support, driving connections for the support including a reversible electric motor, a reversing switch for the motor, means for varying the motor speed, and control devices for the support comprising a reversing lever having alternative running positions and cooperating reversing dogs relatively located on the support and on said base to control the movement of the support, switch connections rendered operative by movement of the reversing lever past a predetermined position to reduce the speed of the motor to a predetermined slow rate, and switch connections rendered operative by further movement of the reversing lever toward the alternate running position to reverse the motor at the faster rate.

33. In a machine tool, the combination of a base, a movable support, driving connections for the support including a variable speed reversible electric motor, and control devices for the support comprising a reversing lever having alternative running positions and cooperating reversing dogs rendered operative by support movement for shifting the lever from one to the other of said positions to reverse the direction of support movement, and switch connections controlled by the actuation of said reversing lever including a slow switch to reduce the motor speed to a predetermined slow rate, and a reversing switch acting thereafter to reverse the motor to cause the support to travel in the opposite direction immediately at the faster rate.

34. In a grinding machine having a table reciprocable longitudinally for effecting relative translatory feeding movements of the grinding wheel and work, the combination with the table of means for reciprocating the table between limiting positions at a uniform rate of travel and for stopping and for starting the table from said positions, said means including an element shiftable to bring said table to a quick stop, adjustable dogs on said table to actuate said shiftable element, and an electrically controlled mechanism which is actuated in timed relation with said shiftable element to start the table moving in a reverse direction after a predetermined time interval.

MAXWELL I. MATHEWSON.
AUGUST L. KRAUSE.